(12) United States Patent
Fu

(10) Patent No.: US 12,326,225 B1
(45) Date of Patent: Jun. 10, 2025

(54) METHOD AND IOT SYSTEM FOR DISTRIBUTED ENERGY PIPELINE NATURAL GAS TRANSMISSION SAFETY MANAGEMENT

(71) Applicant: CHENGDU JIUGUAN SMART ENERGY TECHNOLOGY CO., LTD., Sichuan (CN)

(72) Inventor: Lin Fu, Chengdu (CN)

(73) Assignee: CHENGDU JIUGUAN SMART ENERGY TECHNOLOGY.CO., LTD., Chengdu (CN)

( * ) Notice: Subject to any disclaimer, the term of this patent is extended or adjusted under 35 U.S.C. 154(b) by 0 days.

(21) Appl. No.: 18/977,869

(22) Filed: Dec. 11, 2024

(30) Foreign Application Priority Data

Nov. 8, 2024 (CN) .......................... 202411587753.7

(51) Int. Cl.
*G05B 13/02* (2006.01)
*F17D 5/00* (2006.01)

(52) U.S. Cl.
CPC ........... *F17D 5/005* (2013.01); *G05B 13/027* (2013.01)

(58) Field of Classification Search
CPC .............................. F17D 5/005; G05B 13/027
See application file for complete search history.

(56) References Cited

U.S. PATENT DOCUMENTS

| | | | |
|---|---|---|---|
| 11,606,378 B1 | 3/2023 | Delpont et al. | |
| 2016/0069778 A1* | 3/2016 | Sahu | G06Q 10/20 702/183 |

(Continued)

FOREIGN PATENT DOCUMENTS

| | | |
|---|---|---|
| CN | 114662803 A | 6/2022 |
| CN | 116957343 B | 12/2023 |

(Continued)

OTHER PUBLICATIONS

Cao, Yue et al., Distributed PCA for Plant-Wide Processes Monitoring with Partial Block Communication, Control and Decision, 35(6): 1281-1290, 2020.

(Continued)

*Primary Examiner* — Christopher E. Everett
(74) *Attorney, Agent, or Firm* — METIS IP LLC

(57) ABSTRACT

The present disclosure provides a method and an Internet of Things (IOT) system for distributed energy pipeline natural gas transmission safety management, the method comprising: obtaining a safety management region, the safety management region is provided with one or more spot-check sites; determining, based on a preset cycle, whether a monitoring sequence of the one or more spot-check sites satisfies a first preset condition during a preset historical time period; in response to determining that a monitoring sequence of the one or more spot-check sites does not satisfy the first preset condition, maintaining a first monitoring instruction of the one or more spot-check sites; in response to determining that the monitoring sequence of the one or more spot-check sites satisfies the first preset condition, adjusting the first monitoring instruction based on the monitoring sequence and an inspection sequence in the preset historical time period, and sending a second monitoring instruction obtained after adjustment to a monitoring sensing and control platform; determining an abnormal probability of the one or more spot-check sites in a predetermined future time period based on the monitoring sequence, the inspection sequence, and an adjacency matrix of gas pipelines; and generating maintenance instructions based on the abnormal probability, sending the maintenance instructions to a maintenance sensing and control platform to deploy maintenance personnel.

9 Claims, 6 Drawing Sheets

(56) References Cited

U.S. PATENT DOCUMENTS

| | | |
|---|---|---|
| 2018/0183650 A1 | 6/2018 | Zhang et al. |
| 2018/0356151 A1* | 12/2018 | Suraganda Narayana ............... G05B 23/0283 |
| 2020/0012270 A1 | 1/2020 | Hollender et al. |
| 2020/0124494 A1* | 4/2020 | Solomon ............... G06Q 50/06 |
| 2020/0240875 A1* | 7/2020 | Venkateswaran ... G01M 99/005 |
| 2021/0263839 A1 | 8/2021 | Kim et al. |
| 2022/0282839 A1* | 9/2022 | Wilson ............... G05B 13/042 |
| 2023/0013006 A1* | 1/2023 | Jacob ............... H04L 43/0811 |
| 2023/0079768 A1* | 3/2023 | Shao ............... G06Q 50/06 137/551 |
| 2023/0125033 A1* | 4/2023 | Shao ............... G06Q 10/06312 705/7.22 |
| 2023/0138371 A1 | 5/2023 | Bandukwala et al. |
| 2023/0143654 A1* | 5/2023 | Shao ............... G06Q 10/20 705/7.26 |
| 2024/0084975 A1 | 3/2024 | Shao et al. |

FOREIGN PATENT DOCUMENTS

| | | |
|---|---|---|
| CN | 117196220 A | 12/2023 |
| CN | 117575341 A | 2/2024 |
| KR | 20230116584 A | 8/2023 |
| WO | 2024141849 A1 | 7/2024 |

OTHER PUBLICATIONS

First Office Action in Chinese Application No. 202411587753.7 mailed on Jan. 8, 2025, 12 pages.

Lv, Zehua et al., Research on Adaptive Optimal Dispatch for Thermal System, Thermal Turbine, 33(4): 260-265, 2004.

Notification to Grant Patent Right for Invention in Chinese Application No. 202411587753.7 mailed on Feb. 20, 2025, 5 pages.

* cited by examiner

400

```
┌─────────────────────────────────────────────────────────────┐
│ Constructing a distribution mapping of a security management region │ ─ 410
│ based on a monitoring sequence of one or more spot-check sites and a │
│              adjacency matrix of gas pipelines.             │
└─────────────────────────────────────────────────────────────┘
                              │
                              ▼
┌─────────────────────────────────────────────────────────────┐
│  Determining an abnormal probability of the gas pipelines in a │ ─ 420
│  predetermined future time period based on the distribution mapping │
│              through an analysis model.                     │
└─────────────────────────────────────────────────────────────┘
                              │
                              ▼
┌─────────────────────────────────────────────────────────────┐
│ Determining an abnormal probability of the one or more spot-check │ ─ 430
│ sites in the predetermined future time period based on the abnormal │
│ probability of the gas pipelines in the predetermined future time period. │
└─────────────────────────────────────────────────────────────┘
```

METHOD AND IOT SYSTEM FOR DISTRIBUTED ENERGY PIPELINE NATURAL GAS TRANSMISSION SAFETY MANAGEMENT

CROSS-REFERENCE TO RELATED APPLICATIONS

This application claims priority to Chinese Patent Application No. 202411587753.7, filed on Nov. 8, 2024, the contents of each of which are hereby incorporated by reference.

TECHNICAL FIELD

The present disclosure generally relates to a field of pipeline natural gas transmission management, and in particular, to a method and an IoT system for distributed energy pipeline natural gas transmission safety management

BACKGROUND

With the development of society, as a safe, efficient, clean, and low-carbon energy source, the proportion of natural gas in China's primary energy consumption is gradually increasing. Usually, there are some safety hazards in a natural gas transportation process, such as pipeline leakage, pipeline blockage, or the like, which require a comprehensive and accurate judgment of natural gas transportation safety risks.

In response to the safety hazards in the natural gas transportation, CN116957343B provides a natural gas transportation safety risk analysis method and system, which discloses that obtaining distribution information of natural gas pipelines and booster stations located on the pipelines, obtaining a line-equipment failure probability set and a line-pipeline failure probability set by analyzing, thereby providing a risk alert for each path of the natural gas pipelines. However, the method analyzes the booster stations, which are located in relatively fixed positions, and the obtained data is not comprehensive enough, resulting in an inaccurate risk judgment.

Therefore, it is desirable to provide a method and an IoT system for distributed energy pipeline natural gas transmission safety management to conduct comprehensive monitoring and maintenance during the transportation process, ensuring the safe operation of the pipelines.

SUMMARY

One or more embodiments of the present disclosure provide an Internet of Things (IoT) system for distributed energy pipeline natural gas transmission safety management, comprising: a distributed energy user platform, a distributed energy safety management platform, a distributed energy sensing and control platform, a distributed energy safety service platform, and a distributed energy sensing network platform; wherein the distributed energy sensing and control platform includes a monitoring sensing and control platform and a maintenance sensing and control platform; the monitoring sensing and control platform is configured to receive monitoring instructions and control one or more monitoring devices and a crawling robot based on the monitoring instructions; the maintenance sensing and control platform is configured to receive maintenance instructions and deploy maintenance personnel based on the maintenance instructions; the distributed energy safety service platform is configured to connect the distributed energy user platform with the distributed energy safety management platform for data transmission; the distributed energy safety management platform is configured to: obtain a safety management region, the safety management region being provided with one or more spot-check sites; determine, based on a preset cycle, whether a monitoring sequence of the one or more spot-check sites satisfies a first preset condition during a preset historical time period; in response to determining that a monitoring sequence of the one or more spot-check sites does not satisfy the first preset condition, maintain a first monitoring instruction of the one or more spot-check sites; in response to determining that the monitoring sequence of the one or more spot-check sites satisfies the first preset condition, adjust the first monitoring instruction based on the monitoring sequence and an inspection sequence in the preset historical time period, and send a second monitoring instruction obtained after adjustment to the monitoring sensing and control platform; determine an abnormal probability of the one or more spot-check sites in a predetermined future time period based on the monitoring sequence, the inspection sequence, and an adjacency matrix of gas pipelines; and generate the maintenance instructions based on the abnormal probability, send the maintenance instructions to the maintenance sensing and control platform to deploy the maintenance personnel.

One or more embodiments of the present disclosure provide a method for distributed energy pipeline natural gas transmission safety management, the method being executed by a distributed energy safety management platform of an IoT system for distributed energy pipeline natural gas transmission safety management, and the method comprising: obtaining a safety management region, the safety management region being provided with one or more spot-check sites; determining, based on a preset cycle, whether a monitoring sequence of the one or more spot-check sites satisfies a first preset condition during a preset historical time period; in response to determining that a monitoring sequence of the one or more spot-check sites does not satisfy the first preset condition, maintaining a first monitoring instruction of the one or more spot-check sites; in response to determining that the monitoring sequence of the one or more spot-check sites satisfies the first preset condition, adjusting the first monitoring instruction based on the monitoring sequence and an inspection sequence in the preset historical time period, and sending a second monitoring instruction obtained after adjustment to a monitoring sensing and control platform; determining an abnormal probability of the one or more spot-check sites in a predetermined future time period based on the monitoring sequence, the inspection sequence, and an adjacency matrix of gas pipelines; and generating maintenance instructions based on the abnormal probability, sending the maintenance instructions to a maintenance sensing and control platform to deploy maintenance personnel.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 4 is an exemplary flowchart illustrating a process for determining an abnormal probability of one or more spot-check sites in a predetermined future time period according to some embodiments of the present disclosure;

DETAILED DESCRIPTION

Safety supervision of natural gas pipeline transportation is an important part of ensuring safe use of natural gas. CN116957343B only discloses analyzing information from natural gas transmission pipelines and booster stations on the natural gas transmission pipelines to derive fault alerts, which is only applicable to situations where pipeline transportation is in trouble due to equipment failure at the booster stations. Therefore, in some embodiments of the present disclosure, by reasonably setting one or more spot-check sites, a spot check intensity can be increased in regions with frequent faults contrapuntally, time waste in regions without faults or with fewer faults can be reduced, the faulty regions can be timely maintain, and the safe operation of pipelines can be ensured.

Figure 1:
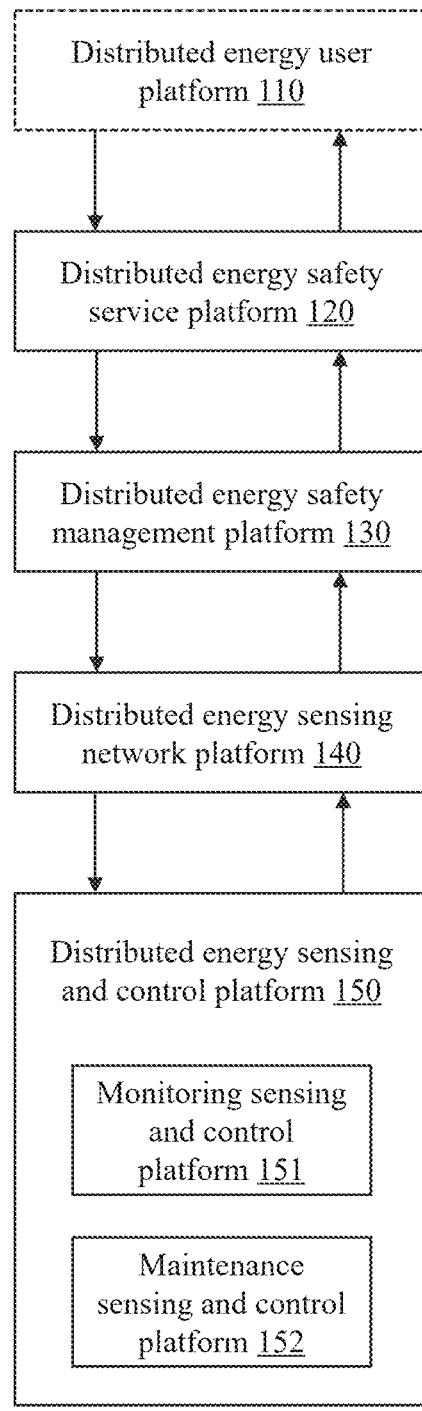
FIG. 1 is a schematic diagram illustrating a platform structure of an IoT system for distributed energy pipeline natural gas transmission safety management according to some embodiments of the present disclosure.

FIG. 1 is a schematic diagram illustrating a platform structure of an IoT system for distributed energy pipeline natural gas transmission safety management according to some embodiments of the present disclosure.

In some embodiments, as shown in FIG. 1, the IoT system 100 for distributed energy pipeline natural gas transmission safety management (being referred to "the IoT system 100" herein) may include a distributed energy user platform 110, a distributed energy safety service platform 120, a distributed energy safety management platform 130, a distributed energy sensing network platform 140, and a distributed energy sensing and control platform 150.

The distributed energy user platform 110 refers to a platform configured to interact with a user. In some embodiments, the distributed energy user platform 110 may bi-directionally interact with the distributed energy safety service platform 120. For example, the distributed energy user platform 110 may receive maintenance information from a maintenance sensing and control platform 152, and adjust a gas usage time based on the maintenance information. The maintenance information refers to information related to maintenance performed by maintenance personnel on a pipeline. For example, the maintenance information may include a maintenance start time, a maintenance end time, a gas pipeline to be maintained, the maintenance personnel performing the maintenance, or the like. The distributed energy user platform 110 may be configured in a user terminal, such as a mobile terminal, a wearable device, or the like.

The distributed energy safety service platform 120 refers to a platform that provides distributed energy pipeline safety services and information. In some embodiments, the distributed energy safety service platform 120 connects the distributed energy user platform 110 and the distributed energy safety management platform 130 for data transmission. The distributed energy safety service platform 120 may bi-directionally interact with the distributed energy user platform 110 and the distributed energy safety management platform 130, respectively.

The distributed energy safety management platform 130 refers to a platform configured to perform a process for distributed energy pipeline natural gas transmission safety management. In some embodiments, the distributed energy safety management platform 130 may coordinate and harmonize connection and collaboration between functional platforms, converge all information of the IOTs, and provide the IOTs operation system with sensing management and control management functions.

In some embodiments, the distributed energy safety management platform 130 is further configured with a processor. In some embodiments, the processor may process at least one of information or data related to the IoT system 100 to perform one or more functions described in the application. In some embodiments, the processor may include a central processing unit (CPU), an application-specific integrated circuit (ASIC), or any combination thereof.

In some embodiments, the distributed energy safety management platform 130 may perform the process for distributed energy pipeline natural gas transmission safety management, and more descriptions of this section may be found in FIG. 2-FIG. 6 and related descriptions.

The distributed energy sensing network platform 140 refers to a functional platform configured to manage sensing communication. In some embodiments, the distributed energy sensing network platform 140 may be configured as a communication network or gateway, or the like. In some embodiments, the distributed energy sensing network platform 140 may function as a sensing communication for sensing information and a sensing communication for controlling information.

In some embodiments, the distributed energy safety management platform 130 and the distributed energy sensing and control platform 150 may be communicatively connected via the distributed energy sensing network platform 140. For example, the distributed energy safety management platform 130 may issue monitoring instructions, and send the monitoring instructions to the distributed energy sensing and control platform 150 via the distributed energy sensing network platform 140. More descriptions of the monitoring instructions may be found in FIG. 2 and related descriptions.

The distributed energy sensing and control platform 150 refers to a platform configured to generate sensing information and execute controlling instructions. In some embodiments, the distributed energy sensing and control platform 150 may bi-directionally interact with the distributed energy sensing network platform 140.

The distributed energy sensing and control platform 150 includes a monitoring sensing and control platform 151 and the maintenance sensing and control platform 152.

In some embodiments, the monitoring sensing and control platform 151 is configured to receive the monitoring instructions and control one or more monitoring devices and a crawling robot based on the monitoring instructions.

In some embodiments, the maintenance sensing and control platform 152 may receive maintenance instructions issued by the distributed energy safety management platform 130, and deploy the maintenance personnel based on the maintenance instructions, and at the same time, generate corresponding maintenance information and send the maintenance information to the distributed energy user platform 110. More descriptions of the maintenance instructions may be found in FIG. 2 and related descriptions.

In some embodiments of the present disclosure, based on IoT system 100, an information operation closed loop can be formed between various functional platforms, and coordinated and regular operation can be realized under unified management of the distributed energy safety management platform, which realizes informationization and intellectualization of the distributed energy pipeline natural gas transmission safety management.

Figure 2:
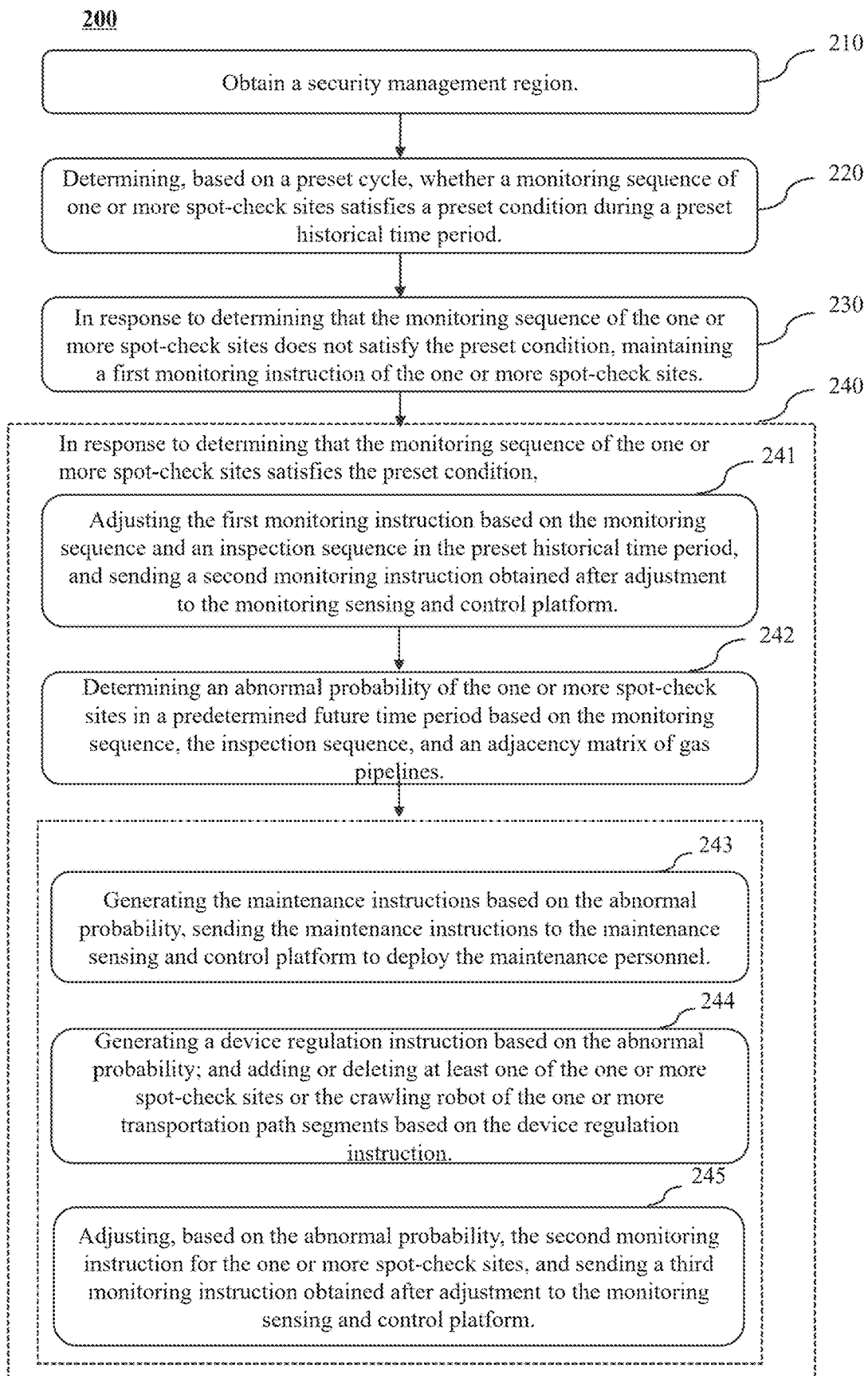
FIG. 2 is an exemplary flowchart illustrating a process for distributed energy pipeline natural gas transmission safety management according to some embodiments of the present disclosure.

FIG. 2 is an exemplary flowchart illustrating a process for distributed energy pipeline natural gas transmission safety management according to some embodiments of the present disclosure. In some embodiments, a process 200 may be performed by the distributed energy safety management platform 130. More descriptions of the distributed energy safety management platform 130 may be found in FIG. 1 and related descriptions.

In some embodiments, the distributed energy safety management platform may be obtain a safety management region, the safety management region is provided with one or more spot-check sites; determine, based on a preset cycle, whether a monitoring sequence of the one or more spot-check sites satisfies a first preset condition during a preset historical time period; in response to determining that a monitoring sequence of the one or more spot-check sites does not satisfy the first preset condition, maintain a first monitoring instruction of the one or more spot-check sites; in response to determining that the monitoring sequence of the one or more spot-check sites satisfies the first preset condition, adjust the first monitoring instruction based on the monitoring sequence and an inspection sequence in the preset historical time period, and send a second monitoring instruction obtained after adjustment to the monitoring sensing and control platform; determine an abnormal probability of the one or more spot-check sites in a predetermined future time period based on the monitoring sequence, the inspection sequence, and an adjacency matrix of gas pipelines; and generate the maintenance instructions based on the abnormal probability, send the maintenance instructions to the maintenance sensing and control platform to deploy the maintenance personnel.

In some embodiments, as shown in FIG. 2, the process 200 includes the following operations.

In 210, the safety management region is obtained.

The safety management region refers to a region where gas transportation needs to be safely monitored, such as a region where the gas transportation begins.

In some embodiments, the distributed energy safety management platform may divide a gas transportation range to be spot-checked into a plurality of safety management regions based on geographic position. For example, the distributed energy safety management platform may divide the gas transportation range to be spot-checked into the plurality of safety management regions based on latitude and longitude. The gas transportation range refers to a region through which the above ground/underground gas pipelines transporting gas pass, including a region through which the above/underground gas pipelines pass along a plurality of transportation paths from a starting point of the gas transportation to an end point.

In some embodiments, the safety management region is provided with the one or more spot-check sites.

The spot-check site refers to a point within the gas pipeline that is set up to conduct inspection, such as a point where the monitoring device is deployed and a starting point where the crawling robot begins the inspection, or the like.

The monitoring device refers to a related device configured to monitor information related to the gas pipeline. For example, the monitoring device may include a pressure sensor, a flow sensor, and a temperature sensor. The point where the monitoring devices is deployed may be set by default by the system.

The crawling robot is a robot that moves within the gas pipeline and monitors the gas pipeline. In some embodiments, the crawling robot may be configured with the three types of sensors included in the above monitoring device. A starting point where the crawling robot begins the inspection may be set by a staff based on experience.

In some embodiments, the distributed energy safety management platform may identify the one or more spot-check sites in a plurality of ways. For example, the distributed energy safety management platform may divide the safety management region evenly into a plurality of sub-regions based on a particular gas pipeline length, and set a center of each sub-region as the spot-check site.

In some embodiments, the distributed energy safety management platform may determine positions of the one or more spot-check sites and adjust thereto based on historical inspection data. More descriptions of this section may be found in FIG. 3 and related descriptions.

In 220, based on the preset cycle, whether the monitoring sequence of the one or more spot-check sites satisfies the first preset condition during the preset historical time period is determined.

The preset cycle refers to a preset time interval between two adjacent determination processes. The determination process refers to a process that determines whether the monitoring sequence satisfies the first preset condition. In some embodiments, to make the obtained monitoring sequence informative, a duration of the preset cycle is at least a duration corresponding to two preset historical time periods.

The preset historical time period refers to a preset time period in history, such as the last hour, the last day, or the like.

In some embodiments, the preset cycle may be obtained in a plurality of ways. For example, the preset cycle may be preset by a staff based on experience.

In some embodiments, the preset cycle is negatively related to an adjustment frequency of monitoring instructions.

The monitoring instructions refer to instructions related to monitoring the gas pipeline. For example, the monitoring instructions may include a monitoring frequency of the monitoring device and an inspection parameter of the crawling robot, or the like.

The monitoring frequency refers to a number of times the gas pipeline is monitored per unit of time, e.g., 30 times/min, or the like.

The inspection parameter refers to a parameter related to the monitoring of the pipeline by the crawling robot. For example, the inspection parameter may include a time interval for the inspection and a distance interval for sending sensing data during the inspection. The time interval refers to an interval between two inspections. The distance interval is an interval between positions when sensing data is sent twice. The sensing data refers to data obtained by a sensor, for example, the sensing data may include pressure sensing data, flow sensing data, temperature sensing data, or the like.

The adjustment frequency of the monitoring instructions refers to a number of times monitoring instructions are adjusted per unit time, e.g., 2 times/h, or the like.

In some embodiments of the present disclosure, the preset cycle is set based on the adjustment frequency of the monitoring instructions. When the monitoring instructions are frequently adjusted, it indicates that the sensing data of the gas pipeline fluctuates more, and abnormal sensing data is more, and at this time, an appropriate shortening of the preset cycle can help to adjust the monitoring instructions in time to improve the safety of the system, when there is an abnormal omen in the gas pipeline.

The monitoring sequence is multiple types of monitoring data related to the gas pipeline during the preset historical time period, such as the pressure sensing data, the flow sensing data, the temperature sensing data, or the like. In some embodiments, the monitoring sequence may be uploaded for acquisition by the monitoring devices at the one or more spot-check sites.

The first preset condition refers to a condition that determines whether the first monitoring instruction needs to be adjusted. More descriptions of the first monitoring instruction may be found in operation 230 and related descriptions.

In some embodiments, the first preset condition relates to an amount of the monitoring data in the monitoring sequence which is not in a normal range. For example, the first preset condition may be that the amount of the monitoring data in the monitoring sequence which is not in the normal range exceeds a preset quantity.

The normal range is a preset range of the amount of the monitoring data. In some embodiments, the distributed energy safety management platform may obtain the normal range by counting the monitoring data in the historical data when the gas pipeline is operating safely.

The preset quantity is a preset maximum value for the amount of the monitoring data which is not in the normal range. The preset quantity may be preset by a staff based on experience.

In some embodiments, the distributed energy safety management platform may determine whether each monitoring data in the monitoring sequence during the preset historical time period is in the normal range, and the amount of the monitoring data that is not in the normal range, and if the amount of the monitoring data that is not in the normal range exceeds a preset quantity, the first preset condition is satisfied.

In 230, in response to determining that the monitoring sequence of the one or more spot-check sites does not satisfy the first preset condition, the first monitoring instruction of the one or more spot-check sites is maintained.

The first monitoring instruction refers to a monitoring instruction at a current preset cycle. The first monitoring instruction is generated by the distributed energy safety management platform.

In some embodiments, when the first preset condition is not satisfied, the amount of the monitoring data in the monitoring sequence which is not in the normal range does not exceed the preset quantity, implying that when the first monitoring instruction is executed, the current monitoring data is relatively stable, the situation of the one or more spot-check sites is relatively safe, and the distributed energy safety management platform may maintain the first monitoring instruction for the one or more spot-check sites.

In 240, in response to determining that the monitoring sequence of the one or more spot-check sites satisfies the first preset condition, the following operations 241-243 are performed.

In 241, the first monitoring instruction is adjusted based on the monitoring sequence and the inspection sequence in the preset historical time period, and the second monitoring instruction obtained after the adjustment is sent to the monitoring sensing and control platform.

The inspection sequence is multiple types of inspection data related to the gas pipeline during the preset historical time period. The inspection data may include inspection time data, an inspection position, and sensing data. The inspection time data refers to time data related to the inspection of the crawling robot, such as an inspection start time point, an inspection end time point, an inspection duration, or the like. The inspection position refers to position data related to the crawling robot during the inspection process, such as an initial position, an end position, or the like. The sensing data included in the inspection data is pressure sensing data, flow sensing data, and temperature sensing data obtained by the inspection robot. In some embodiments, the inspection sequence may be uploaded for acquisition by the crawling robot.

In some embodiments, the distributed energy safety management platform may adjust the first monitoring instruction based on the monitoring sequence and the inspection sequence during the preset historical time period in a plurality of ways. For example, the distributed energy safety management platform may adjust the first monitoring instruction by vector matching.

For example, the distributed energy safety management platform may construct a first criterion vector library. The first criterion vector library may include a plurality of first criterion vectors and the corresponding plurality of labels. The first criterion vectors may include the monitoring sequence and the inspection sequence, and the labels may be preferred monitoring frequencies and inspection parameters.

In some embodiments, the distributed energy safety management platform may construct a first clustering vector based on a historical monitoring sequence and a historical inspection sequence in historical data, cluster a plurality of first clustering vectors, construct the first criterion vector based on the historical monitoring sequences and the historical inspection sequences corresponding to clustering centers formed by clustering, and determine, in the monitoring frequencies and the inspection parameters corresponding to the clustering centers, the monitoring frequencies and the inspection parameters corresponding to the most abnormal data subsequently found as the preferred monitoring frequencies and inspection parameters.

The historical monitoring sequence and the historical inspection sequence refer to the monitoring sequence and the inspection sequence during a historical preset time period. The abnormal data refers to the monitoring data that is not in the normal range of the monitoring sequence.

In some embodiments, the distributed energy safety management platform may construct a first to-be-matched vector based on the monitoring sequence and the inspection sequence within a current preset historical time period, match the first to-be-matched vector with the first criterion vectors in the first criterion vector library, calculate a plurality of vector similarities between the first to-be-matched vector and the plurality of first criterion vectors, and determine a label corresponding to a first criterion vector with a highest vector similarity as the monitoring frequency and the inspection parameter after adjustment. The vector similarities may be expressed by a cosine similarity, an Euclidean distance, or the like.

The second monitoring instruction refers to a monitoring instruction obtained by adjusting the first monitoring instruction. In some embodiments, the distributed energy safety management platform may obtain the monitoring frequencies and the inspection parameters after adjustment as the second monitoring instruction based on the vector matching described above.

In some embodiments, the distributed energy safety management platform may send the second monitoring instruction to the monitoring sensing and control platform. More descriptions of the monitoring sensing and control platform may be found in FIG. 1 and related descriptions.

In 242, the abnormal probability of the one or more spot-check sites in the predetermined future time period is determined, based on the monitoring sequence, the inspection sequence, and the adjacency matrix of the gas pipelines.

The adjacency matrix of the gas pipelines refers to a two-dimensional matrix for reflecting the connectivities of different gas pipelines. In some embodiments, the adjacency matrix of the gas pipelines may also indicate a direction of gas transportation. For example, assuming that the matrix is D, a gas pipeline 1 is connected with a gas pipeline 2, and the gas pipeline 1 is an upstream pipeline of the gas pipeline 2, then D [gas pipeline 1] [gas pipeline 2]=1, D [gas pipeline 2] [gas pipeline 1]=−1. In some embodiments, the adjacency matrix of the gas pipelines may be preset by a staff based on a distribution mapping of the gas pipelines stored in the system.

The predetermined future time period refers to a predetermined time period in the future, such as a day in the future, a week in the future, or the like. The predetermined future time period may be preset by a staff based on experience.

The abnormal probability refers to a probability that an anomaly occurs at the one or more spot-check sites during the predetermined future time period. It is to be understood that the abnormal probability occurring at the one or more spot-check sites is an abnormal probability occurring at the gas pipeline corresponding to the spot-check site.

In some embodiments, the distributed energy safety management platform may determine the abnormal probability of the one or more spot-check sites in the predetermined future time period based on the monitoring sequence, the inspection sequence, and the adjacency matrix of the gas pipelines in a plurality of ways. For example, the distributed energy safety management platform may determine the abnormal probability of the one or more spot-check sites in the predetermined future time period by querying a first preset table. The first preset table refers to a table that contains a correspondence between the monitoring sequence and the adjacency matrix of the gas pipelines and the abnormal probability of the one or more spot-check sites in the predetermined future time period.

In some embodiments, the distributed energy safety management platform may construct a second clustering vector based on the monitoring sequence and the adjacency matrix of the gas pipelines in the historical data, cluster a plurality of second clustering vectors, statistically count the number of the gas pipelines with anomalies in the predetermined future time period in each cluster obtained by the clustering, calculate a ratio of the number of the gas pipelines with anomalies in the predetermined future time period in each cluster obtained by the clustering to a total number of the gas pipelines in the cluster, and count the ratio as a corresponding abnormal probability in the predetermined future time period in the first preset table.

The gas pipelines with anomalies mean that there is anomalous data in the monitoring sequence corresponding to the gas pipelines.

In some embodiments, the distributed energy safety management platform may construct a distribution mapping of the safety management region based on the monitoring sequence and the adjacency matrix of the gas pipelines; and determine the abnormal probability of the one or more spot-check sites in the predetermined future time period based on the distribution mapping through an analysis model. More descriptions of this section may be found in FIG. 5 and related descriptions.

In 243, the maintenance instructions are generated based on the abnormal probability, and the maintenance instructions are sent to the maintenance sensing and control platform to deploy the maintenance personnel.

The maintenance instructions refer to instructions related to performing maintenance on the pipeline. In some embodiments, the distributed energy safety management platform may send the maintenance instructions to the maintenance sensing and control platform. More descriptions of the maintenance sensing and control platform may be found in FIG. 1 and related descriptions.

In some embodiments, in response to determining that the abnormal probability is greater than a first predetermined threshold, the distributed energy safety management platform may generate the maintenance instructions.

The first predetermined threshold refers to a predetermined maximum value of the abnormal probability. The first predetermined threshold may be preset by a staff based on experience.

In some embodiments of the present disclosure, by setting the first predetermined threshold to compare with the abnormal probability, it is possible to quickly and efficiently determine whether it is necessary to generate the maintenance instructions, which is conducive to timely maintenance of abnormal pipelines.

In some embodiments, in response to determining that the maintenance sensing and control platform receives the maintenance instructions, the maintenance sensing and control platform may deploy the maintenance personnel that is currently available to perform maintenance on the pipelines.

In some embodiments, the process 200 further includes the following operation 244.

In 244, a device regulation instruction is generated based on the abnormal probability; and at least one of the one or more spot-check sites or the crawling robot of one or more transportation path segments is added or deleted, based on the device regulation instruction.

The device regulation instruction refers to an instruction related to the regulation of the one or more spot-check sites and the crawling robot such as adding a spot-check site, or the like.

In some embodiments, in response to determining that the abnormal probability exceeds a second predetermined threshold, the device regulation instruction is configured to control the addition of at least one spot-check site or crawling robot in the transportation path segment; and in response to determining that the abnormal probability is less than a third predetermined threshold and there are multiple spot-check sites or the crawling robots within the transportation path segments, the device regulation instruction is configured to control the deletion of at least one spot-check site or crawling robot in the transportation path segment.

The second predetermined threshold and the third predetermined threshold refer to predetermined probabilistic thresholds for determining a need to add or delete the spot-check site or the crawling robot, respectively. In some embodiments, the second predetermined threshold is greater than the third predetermined threshold. The second predetermined threshold and the third predetermined threshold may be preset by a staff based on experience.

In some embodiments, an additional spot-check site is located at a center point between a position of an existing spot-check site and a distal end of a path segment corresponding to the existing spot-check site. The distal end of the path segment corresponding to the existing spot-check site refers to a distal endpoint of the transportation path segment that is farther (e.g., the farthest) from the existing spot-check site among all the transportation path segments corresponding to the spot-check site. The inspection parameters of the additional crawling robot are the same as those of the existing crawling robot, a first inspection by the additional crawling robot begins within a period of time after the existing crawling robot begins its inspection, and the period of time is less than the time taken by the crawling robot to perform one inspection.

In some embodiments, the distributed energy safety management platform deleting the at least one of the one or more spot-check sites or the crawling robot includes: deleting a spot-check site with the least fluctuating in the monitoring sequence within the preset historical time period, deleting the crawling robot with the least fluctuating in the inspection sequence within the preset historical time period.

The fluctuation of the monitoring sequence or the inspection sequence is relatively small, which indicates that a position of the spot-check site or an inspection point of the crawling robot is less effective in responding to changes of the gas pipelines, feedback effect of the setup of the spot-check site or the crawling robot is less effective in responding to the transportation status of the current gas pipeline, and the spot-check site or the crawling robot may be deleted to save costs.

In some embodiments of the present disclosure, determining the abnormal probability based on empirically set thresholds allows for determining appropriate device regulation instruction, making the number of the spot-check sites and the crawling robot more reasonable, and allowing for abnormalities to occur in subsequent pipelines to be timely processed.

In some embodiments of the present disclosure, setting the device regulation instruction based on the abnormal probability can make the device regulation instruction generated more in line with the actual situation of the current pipeline, and the adding or deleting of at least one spot-check site or the crawling robot can reduce the influence of at least one spot-check site or the crawling robot to the pipeline.

In some embodiments, the process 200 further includes the following operation 245.

In 245, the second monitoring instruction for the one or more spot-check sites is adjusted based on the abnormal probability, and the third monitoring instruction obtained after adjustment is sent to the monitoring sensing and control platform.

The third monitoring instruction refers to the monitoring instruction obtained by adjusting the second monitoring instruction.

In some embodiments, the distributed energy safety management platform may adjust the second monitoring instruction based on the abnormal probability in a plurality of ways. For example, the distributed energy safety management platform may statistically determine, in the historical data, the usage effect of the monitoring instructions corresponding to the same abnormal probability corresponding to the subsequent actual use, and adjust the second monitoring instruction based on the monitoring instruction with the best usage effect of the subsequent actual use. The best usage effect means that the subsequent monitoring instruction actually used obtains at least one of the least abnormal data or the largest number of times of the abnormal data in the monitoring sequence and the inspection sequence.

In some embodiments, the second monitoring instruction for adjusting the one or more spot-check sites includes adjusting a monitoring frequency and an inspection parameter of the second monitoring instruction.

In some embodiments, the monitoring frequency may be determined based on a first monitoring frequency, a second monitoring frequency, and the abnormal probability. The first monitoring frequency refers to a lowest monitoring frequency that the sensor may achieve. The second monitoring frequency refers to a highest monitoring frequency that the sensor may achieve. The lowest monitoring frequency, the highest monitoring frequency may be determined by the performance of the sensor.

In some embodiments, the distributed energy safety management platform may determine the monitoring frequency based on the first monitoring frequency, the second monitoring frequency, and the abnormal probability through a predetermined formula. Exemplarily, the predetermined formula may be represented by the following formula (1):

$$p = p_1 + (p_2 - p_1) * s \qquad (1)$$

p, $p_1$, and $p_2$ denote the monitoring frequency, the first monitoring frequency, and the second monitoring frequency, respectively, and s denotes the abnormal probability.

In some embodiments, the inspection parameter may include a time interval for inspection of the crawling robot and a distance interval at which sensing data is sent during the inspection.

In some embodiments, the time interval may be determined based on a first time interval, a second time interval, and the abnormal probability. The first time interval refers to a minimum time interval between two inspections of the crawling robot. The second time interval refers to a maximum time interval between two inspections of the crawling robot.

In some embodiments, the distance interval may be determined based on a first distance interval, a second distance interval, and the abnormal probability. The first distance interval refers to a minimum distance interval between two inspections of the crawling robot. The second distance interval refers to a maximum distance interval between two inspections of the crawling robot.

The minimum time interval, the maximum time interval, the minimum distance interval, and the maximum distance interval may be preset by a staff based on experience. The manner of determining the time interval and the distance interval is similar to the manner of determining the monitoring frequency, which is not described herein.

In some embodiments of the present disclosure, based on the abnormal probability, the monitoring frequency of the sensor and the inspection parameter of the crawling robot are determined, which can make the second monitoring instruction after adjustment more accurate.

In some embodiments, the first distance intervals are not the same for different preset cycles, and the second distance intervals are not the same for different preset cycles; the first distance intervals and the second distance intervals are determined based on a pressure fluctuation value and a flow rate fluctuation value of the monitoring sequence during the cycle and a robot accuracy coefficient.

The pressure fluctuation value refers to a pressure difference between upper and lower limits of the pressure sensing data in the monitoring sequence. For example, the pressure fluctuation value is equal to the upper limit minus the lower limit of the pressure sensing data.

The flow fluctuation value refers to a flow difference between upper and lower limits of the flow sensing data in the monitoring sequence. For example, the flow fluctuation value is equal to the upper limit minus the lower limit of the flow sensing data.

The robot accuracy coefficient refers to a coefficient that reflects an accuracy of the sensor carried by the crawling robot. The robot accuracy coefficient may be obtained based on factory-set parameters of the crawling robot.

In some embodiments, the first distance interval is inversely proportional to a maximum pressure fluctuation value and a maximum flow fluctuation value, and directly proportional to the robot accuracy coefficient. In some embodiments, the distributed energy safety management platform may determine the first distance interval based on the robot accuracy coefficient, the maximum pressure fluctuation value, and the maximum flow fluctuation value through a predetermined formula. Exemplarily, the predetermined formula may be represented by the following formula (2):

$$d_1 = k/(h_1 + f_1) \qquad (2)$$

$d_1$ denotes the first distance interval, k denotes the robot accuracy coefficient, $h_1$ denotes the maximum pressure fluctuation value, and $f_1$ denotes the maximum flow fluctuation value.

In some embodiments, the second distance interval is inversely proportional to a minimum pressure fluctuation value and a minimum flow fluctuation value, and directly proportional to the robot accuracy coefficient. The manner of determining the second distance interval is the same as the manner of determining the first distance interval, which is not described herein.

In some embodiments of the present disclosure, the pressure fluctuation value, the flow fluctuation value, and the robot accuracy coefficient in the preset cycle can make the first distance interval and the second distance interval after determination conform to the actual situation of the current preset cycle and be more accurate.

In some embodiments of the present disclosure, adjusting the second monitoring instruction based on the abnormal probability can make the third monitoring instruction obtained after the adjustment more in line with the actual situation of the pipeline, and the monitoring devices and the crawling robot corresponding to the third monitoring instruction can timely respond to the changes in the pipeline, which is favorable to the safe operation of the pipeline.

In some embodiments of the present disclosure, by reasonably setting up the spot-check sites, the monitoring of the monitoring devices and the crawling robot can be more targeted; by determining the monitoring sequence of the spot-check sites at every preset cycle, whether the monitoring sequence corresponding to the current pipeline is in a normal state can be effectively determined, and based on the judgment result, whether the current monitoring instructions need to be adjusted can be determined; based on the monitoring sequence, the inspection sequence and the adjacency matrix of the gas pipeline, the abnormal probability of the spot-check sites in the predetermined future time period can be effectively determined; and based on the abnormal probability of the spot-check sites, the corresponding maintenance instructions can be generated, and the maintenance personnel can be deployed to carry out repairs in time to protect the safety of the pipeline and reduce the inconvenience caused by the pipeline anomalies.

Figure 3:
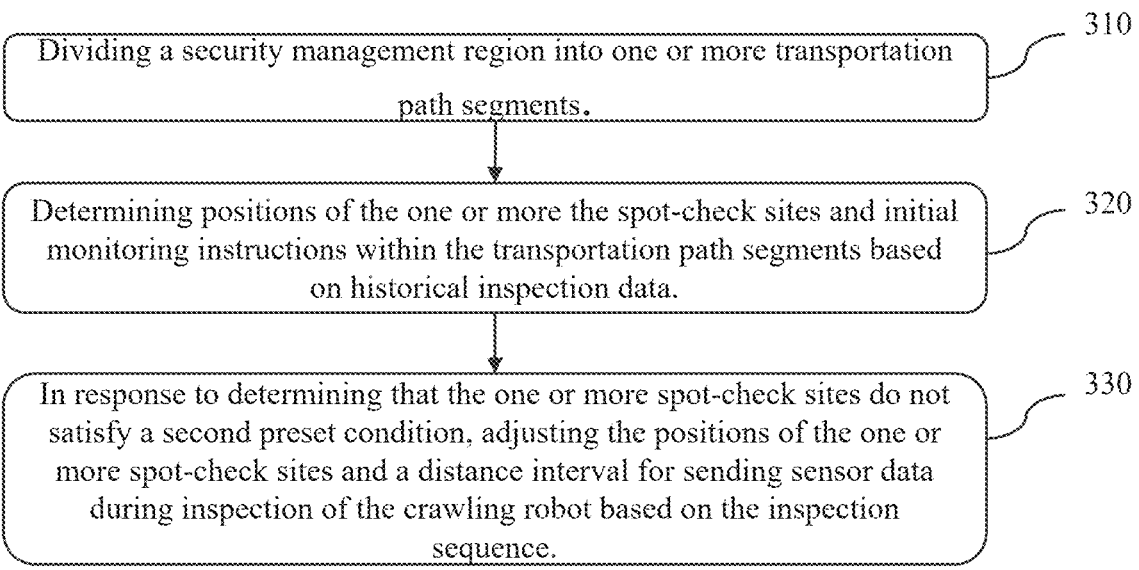
FIG. 3 is an exemplary flowchart illustrating a process for adjusting positions of one or more spot-check sites and a distance interval for sending sensor data during inspection of a crawling robot according to some embodiments of the present disclosure.

FIG. 3 is an exemplary flowchart illustrating a process for adjusting positions of one or more spot-check sites and a distance interval for sending sensor data during inspection of a crawling robot according to some embodiments of the present disclosure. In some embodiments, a process 300 may be performed by the distributed energy safety management platform 130.

In some embodiments, the distributed energy safety management platform divides a security management region into one or more transportation path segments; determines positions of the one or more spot-check sites and initial monitoring instructions within the transportation path segments based on historical inspection data; and in response to determining that the one or more spot-check sites do not satisfy a second preset condition, adjust positions of the one or more spot-check sites and the distance interval for sending the sensing data during the inspection of the crawling robot based on an inspection sequence; wherein the second preset condition is related to monitoring data of the one or more spot-check sites.

In some embodiments, as shown in FIG. 3, the process 300 includes the following operations.

In 310, the security management region is divided into the one or more transportation path segments.

The transportation path segment refers to a path segment through which a portion of a gas pipeline segment in the security management region passes.

Each transportation path in each security management region may be divided into one or more transportation path segments.

The transportation path refers to a pathway that above or underground gas pipelines take from a starting point of gas transportation to an end point. The transportation path segment refers to a path segment that the corresponding portion of the gas pipeline in the transportation path travels.

In some embodiments, the distributed energy safety management platform may divide a plurality of transportation paths included in each of the security management regions into a plurality of transportation path segments, respectively, wherein each of the plurality of transportation paths may be divided into the plurality of transportation path segments.

In some embodiments, the distributed energy safety management platform divides all transportation paths in the security management region into different numbers of candidate path segments based on different lengths of the transportation paths; based on priorities of the transportation paths and a plurality of coverage areas of the candidate path segments, several candidate path segments are selected as the transportation path segments of the security management region; wherein the priority of the transportation path is positively related to the length of the transportation path.

The candidate path segments refer to path segments that are alternatively used as the transportation path segments based on an initial delineation of the transportation paths within the security management region.

In some embodiments, the distributed energy safety management platform performs a mathematical calculation on all transportation paths within the security management region based on lengths of the transportation paths, and correspondingly, divides the transportation paths with different lengths into different numbers of the candidate path segments. For example, the distributed energy safety management platform rounds up a ratio of the length of each transportation path to a length of a standard transportation path to determine the number of the candidate path segments corresponding to the transportation path.

The length of the standard transportation path refers to a value preset by the system to measure a length of the path.

To ensure that the spot-check sites are set in positions that enables inspection data obtained by the spot-check sites to cover the entire security management region and avoids setting too many spot-check sites to save costs, the distributed energy safety management platform distinguishes between a main transportation path and branch transportation paths in the security management region, and adopts different ways to divide the transportation path segments for the main transportation path and the branch transportation paths.

In some embodiments, dividing all transportation paths within the security management region into different numbers of the candidate path segments based on different lengths of the transportation paths includes: selecting the transportation path with the highest priority within the security management region as the main transportation path, dividing the main transportation path into N candidate path segments; determining the transportation paths other than the main transportation path in the security management region as the branch transportation paths, and determining the number of the candidate path segments of the branch transportation paths based on a value of N, the length of the branch transportation paths, and the length of the standard transportation path.

The main transportation path refers to a transportation path with the highest priority within the security management region, i.e., the longest transportation path within the security management region.

The priority refers to a priority degree with which a transportation path is divided into one or more transportation path segments. The distributed energy safety management platform may set the corresponding priority based on the length of the transportation path. The longer the length of the transportation path, the higher the priority of the transportation path.

There is typically one main transportation path included within each security management region. If more than one of the longest transportation paths within the security management region exists at the same time, a further filtering method may be used to prioritize the transportation paths. For example, the distributed energy safety management platform may quantify historical gas flow, a historical accident frequency, and other relevant factors corresponding to each transportation path and perform a weighted sum thereof, and take a transportation path with a highest weighted sum as a main transportation path with the highest priority, and based on a descending order of the weighted sum of the rest of the transportation paths, set the priority of the rest of the transportation paths to the second, the third, or the like.

In some embodiments, the distributed energy safety management platform may divide the main transportation path into N candidate path segments.

N refers to a number of the candidate path segments into which the main transportation path is divided.

The value of N is positively related to the number of the gas pipelines involved in the main transportation path. For example, the larger the number of the gas pipelines involved in the main transportation path, the larger the value.

In some embodiments, the distributed energy safety management platform may set the value of N based on historical experience.

In some embodiments, the distributed energy safety management platform may also set the value of N based on the number of the gas pipelines involved in the main transportation path. For example, the distributed energy safety management platform may multiply the number of the gas pipelines involved in the main transportation path by a preset scaling factor, which may result in the N value corresponding to the main transportation path. The preset scaling factor may be preset by the system.

The branch transportation paths refer to transportation paths other than the main transportation paths in the security management region.

A path length of the branch transportation path is shorter than a path length of the main transportation path in the same security management region. The number of the branch transportation paths corresponding to the same priority in the same security management region is usually 1. When there are a plurality of the branch transportation paths with the same length at the same time (e.g., the number of the transportation paths with the second longest length is greater than or equal to 2), the priority of the branch transportation paths may be determined in a manner similar to a manner of the main transportation path, which may not be discussed here.

In some embodiments, the distributed energy safety management platform may determine, based on the length of the branch transportation path corresponding to the branch transportation path, the length of the standard transportation path, and the value of N corresponding to the main transportation path, the number of the candidate path segments into which the branch transportation path is divided. For example, the distributed energy safety management platform may determine the number of the candidate path segments into which the branch transportation path is divided by calculating a ratio of the length of the transportation path of the branch transportation path to the length of the standard transportation path, calculating a product of the ratio and N, and rounding up the product.

In some embodiments of the present disclosure, the larger the number of the gas pipelines involved in the transportation path, the more complex the connections on the transportation path; at this time, it is necessary to set up more spot-check sites and more crawling robots; and introducing the N value to divide the transportation path segments can further ensure the rationality of the set of the spot-check sites and the crawling robots, which can help to ensure the effectiveness of safety management and control the cost at the same time.

In some embodiments, the distributed energy safety management platform may randomly select the plurality of the candidate path segments to be used as the transportation path segments in the security management region.

In some embodiments, the distributed energy safety management platform selects the plurality of the candidate path segments based on the priorities of the transportation paths and the coverage areas of the plurality of the candidate path segments as the transportation path segments of the security management region, including one or more of the following operations S1-S6.

In S1, all candidate path segments on the transportation path with the highest priority are selected as first candidate transportation path segments in the security management region.

In S2, coverage area of the first candidate transportation path segment within the security management region is calculated.

The coverage area refers to an area corresponding to circular area centered on a center of the transportation path segment.

In some embodiments, the distributed energy safety management platform may take a center point of each first candidate transportation path segment (e.g., a center point of the gas pipeline corresponding to each first candidate transportation path segment) as a center of the circle, delineate the circular area with a preset diameter, calculate the area of the circular area corresponding to each first candidate transportation path segment, accumulate areas of the circular areas corresponding to all the first candidate transportation path segments and remove overlapping parts, and determine the result as the coverage area of the current first candidate transportation path segment. The preset diameter may be set by a staff based on experience. The manner of calculating the coverage area of the remaining candidate transportation path segments such as calculating the second candidate transportation path segment, is similar to the manner of calculating the coverage area of the first candidate transportation path segment, which may not be repeated here.

In S3, in response to determining that the coverage area of the first candidate transportation path segment is greater than a coverage area threshold, the first candidate transportation path segment is used as the transportation path segment.

The coverage area threshold may be set empirically.

The coverage area threshold is positively related with the number of the candidate path segments. For example, the greater the number of the candidate path segments, the greater the coverage area threshold is set.

In some embodiments of the present disclosure, the larger the number of the candidate path segments, the larger the whole gas pipeline network, and the more complex the structure. Setting the coverage area threshold associated with the number of the candidate path segments can help to obtain more comprehensive and more targeted monitoring data and inspection data.

In S4, in response to determining that the coverage area of the first candidate transportation path segment is less than the coverage area threshold, a coverage area in the security management region of all the candidate path segments on the transportation path with the second priority is calculated.

The way of dividing the candidate path segments corresponding to the transportation path with the second priority can be referred to the preceding description of the division of the branch transportation path. The manner of calculating the coverage area of the remaining candidate transportation path segments other than the first candidate transportation path segment is similar to the manner of calculating the coverage area of the first candidate transportation path segment as described previously, which may not be repeated here.

In S5, a path segment on the second priority transportation path with a minimum overlap between the coverage area of the second priority transportation path and the coverage area of the first candidate transportation path segment is selected as a second candidate transportation path segment.

The overlap ratio refers to a proportion of overlap between the areas covered by the corresponding coverage areas (referred to as the coverage areas) of each of the two sets of candidate transportation path segments (e.g., the first candidate transportation path segment and the second candidate transportation path segment).

In S51, in response to determining that a sum of the coverage areas of the first candidate transportation path segment and the second candidate transportation path segment is greater than the coverage area threshold, the first candidate transportation path segment and the second candidate transportation path segment are used as the transportation path segments.

In S52: in response to determining that the sum of the coverage areas of the first candidate transportation path segment and the second candidate transportation path segment is less than the coverage area threshold, the path segment on the transportation path with the second highest priority and with the second-smallest overlap ratio between the coverage area of the transportation path with the second highest priority and the coverage area of the first candidate transportation path segment is selected as a third candidate transportation path segment.

In S6, based on the operation S4, the operation S5, and so on are traversed until a sum of the coverage areas of the current first candidate transportation path segment, the second candidate transportation path segment, . . . , and the nth candidate transportation path segment is greater than the coverage area threshold, the current first candidate transportation path segment, the second candidate transportation path segment, . . . , and the nth candidate transportation path segment are used as final transportation path segments.

In some embodiments of the present disclosure, based on the operations S1 to S6 described above, it is possible to more precisely and reasonably delineate the security management region and select the transportation path segments that are more representative and have sufficiently large coverage areas.

In some embodiments of the present disclosure, the transportation path segments in the security management region are determined by combining the priority of the transportation paths with the coverage areas of the plurality of candidate path segments, which improves the representativeness and comprehensiveness of the monitoring data and the inspection data, and improves effectiveness of the natural gas transmission safety management.

In 320, positions of the one or more spot-check sites and initial monitoring instructions within the transportation path segments are determined based on historical inspection data.

The historical inspection data refers to relevant data such as historical records of manual inspections. The historical inspection data may include hazard points identified during manual inspections and/or points of past incidents and associated accident loss values.

The hazard points refer to points where the gas pipelines are prone to failure.

In some embodiments, the distributed energy safety management platform may determine the hazard points based on a history record of failures occurring at the point and a history record of failures occurring in the vicinity of the point. For example, although a point A has no a history of failures, a point B and a point C that are neighboring the point A have the history of failures, the point A may be set up as the hazard point.

The hazard points may also be set by inspectors based on inspections.

The accident loss values refer to data characterizing the extent of damage resulting from an accident at the point. In some embodiments, the accident loss value may be expressed as a weighted sum of the number of accidents that have occurred at the point, an average of an outage area affected by the occurrence of the accident, and an average of an outage length at the time of the occurrence of the accident. The weighting factor may be set by staff based on experience.

The positions of the one or more spot-check sites are geographic positions of the one or more spot-check sites. More descriptions of the spot-check sites may be found in FIG. 2 and related descriptions.

In some embodiments, for each transportation path segment, the distributed energy safety management platform may construct third clustering vectors based on the hazard points or the points of past incidents through a clustering algorithm, cluster a plurality of the third clustering vectors, determine a clustering center, and select a position corresponding to a clustering center of the cluster with the highest number of clustered points as a position of the spot-check site within the gas transportation path segment. The clustering algorithm may include but is not limited to K-Means (K-means) clustering and/or density-based clustering methods (DBSCAN), or the like. More descriptions of the cluster may be found in FIG. 2 and related descriptions.

The initial monitoring instruction refers to a monitoring instruction that is initially set for the one or more spot-check sites. Each of the one or more spot-check sites has an initial monitoring instruction.

In some embodiments, the distributed energy safety management platform may adjust, based on an adjustment ratio, a preset monitoring instruction corresponding to the security management region as the initial monitoring instruction for the path segment. The preset monitoring instruction may be the monitoring instruction factory-set for the monitoring device.

In some embodiments, the distributed energy safety management platform may determine the adjustment ratio based on an average value of the accident loss values within the pathway segment in the historical data and an average value of the accident loss values within the security management region in which the pathway segment is located. Exemplarily, the distributed energy safety management platform may determine the adjustment ratio according to the following formula (3):

$$n=(k_x-k_m)/k_m \quad (3)$$

n denotes the adjustment ratio, $k_x$ denotes the average value of the accident loss values within the path segment, and $k_m$ denotes the average value of the accident loss values within the security management region in which the path segment is located. In some embodiments, the distributed energy safety management platform may obtain the average value of the accident loss value within the path segment and the average value of the accident loss value within the security management region in which the path segment is located by calling the historical data stored by the system.

If the average value of the accident loss value within the path segment is greater than the average value of the accident loss value within the security management region in which the path segment is located, the distributed energy safety management platform increases the monitoring frequency, reduces a time interval for the inspections, and reduces a distance interval for sending the sensing data during the inspection based on the adjustment ratio. On the contrary, if the average value of the accident loss value within the path segment is smaller than the average value of the accident loss value within the security management region in which the path segment is located, the distributed energy safety management platform reduces the monitoring frequency, increase the time interval for the inspections, and increase the distance interval for sending the sensing data during the inspection based on the adjustment ratio.

For example, if the average value of the accident loss value within the path segment is greater than the average value of the accident loss value within the security management region in which the path segment is located, and the absolute value of the determined adjustment ratio is M %, then the adjustments to the preset monitoring instruction include: increasing the monitoring frequency by M % based on the adjustment ratio, decreasing the time interval for the inspections by M % based on the adjustment ratio, and decreasing the distance interval for sending sensing data during the inspection by M % based on the adjustment ratio.

In 330, in response to determining that the one or more spot-check sites do not satisfy the second preset condition, the positions of the one or more spot-check sites and the distance interval for sending the sensor data during the inspection of the crawling robot are adjusted based on the inspection sequence.

The second preset condition refers to a condition that needs to be met to determine whether to perform the adjustment process. The adjustment process refers to adjusting the positions of the one or more spot-check sites and the distance interval for sending the sensor data during the inspection of the crawling robot. The second preset condition relates to the monitoring data of the one or more spot-check sites. For example, the second preset condition includes that the monitoring data sent by the one or more spot-check sites is in a normal range when an incident occurs within the current transportation path segment after the position of the spot-check site is determined.

In some embodiments, in response to determining that the one or more spot-check sites do not satisfy the second preset condition, the distributed energy safety management platform obtains a plurality of inspection sequences before the occurrence of the accident, selects center positions of a plurality of gas pipelines corresponding to a plurality of sensing data that are not in the normal range as adjusted positions of the one or more spot-check sites.

If the previous and/or subsequent sensing data of the sensing data that is not in the normal range is in the normal range during the inspection sequence, the distributed energy safety management platform scales down the distance interval for sending the sensor data during the inspection of the crawling robot, such as reducing to 50% of the original.

Understandably, when an accident occurs in the gas pipeline, there are a plurality of points at which the sensing data is abnormal. Therefore, when the previous and/or subsequent sensing data of the sensing data that is not in the normal range is in the normal range during the inspection sequence, it means that the distance interval for sending the sensor data during the inspection of the crawling robot is too large, at this time, a midpoint of the two processes for sending the sensor data to ensure that enough abnormal data is collected. More descriptions of the distance interval for sending the sensor data may be found in FIG. 2 and related descriptions.

In some embodiments of the present disclosure, based on the historical inspection data and the inspection sequence, the positions of the one or more spot-check sites and the distance interval for sending the sensor data sent during the inspection of the crawling robot are adjusted, which realizes a more reasonable position setting of the one or more spot-check sites and a more reasonable distance interval setting of the crawling robot, helps to obtain more accurate and appropriate monitoring data and inspection data, and improves the monitoring of abnormal situations.

FIG. 4 is an exemplary flowchart illustrating a process for determining an abnormal probability of one or more spot-check sites in a predetermined future time period according to some embodiments of the present disclosure. In some embodiments, a process 400 may be performed by the distributed energy safety management platform 130.

In some embodiments, the distributed energy safety management platform constructs a distribution mapping of a security management region based on a monitoring sequence of one or more spot-check sites and an adjacency matrix of gas pipelines; wherein nodes of the distribution mapping are the gas pipelines, and node features of the distribution mapping are the monitoring sequence of the one or more spot-check sites that satisfy a predetermined distance condition, and edges of the distribution mapping denote connection relationships between different gas pipelines; determines an abnormal probability of the gas pipelines in the predetermined future time period based on the distribution mapping through an analysis model; wherein the analysis model is a machine learning model; and determines the abnormal probability of the one or more spot-check sites in the predetermined future time period based on the abnormal probability of the gas pipelines in the predetermined future time period.

In some embodiments, as shown in FIG. 4, the process 400 includes the following operations.

In 410, the distribution mapping of the security management region is constructed based on the monitoring sequence of the one or more spot-check sites and the adjacency matrix of the gas pipelines.

Figure 5:
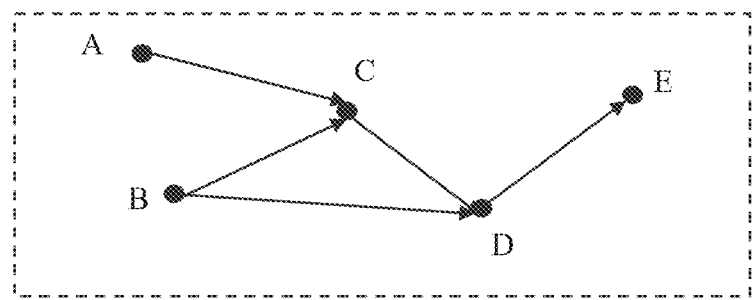
FIG. 5 is an exemplary schematic diagram illustrating a distribution mapping according to some embodiments of the present disclosure.

The nodes of the distribution mapping are the gas pipelines. As shown in FIG. 5, the distribution mapping 500 includes node A-node E, which correspond to gas pipeline a-gas pipeline e, respectively (not shown in the figure).

The node features of the distribution mapping include the monitoring sequence of the one or more spot-check sites that satisfy the predetermined distance condition. The predetermined distance condition includes the spot-check site having a shortest transportation distance from the gas pipeline corresponding to the node. The predetermined distance condition may be preset by a staff based on experience.

The nodes of the distribution mapping include a root node and a non-root node. More descriptions of the root node and the non-root node may be found in FIG. 6 and related descriptions.

The edges of the distribution mapping denote connection relationships between different gas pipelines. If the gas pipelines corresponding to two nodes are connected, there exists an interconnecting edge between the two nodes, and a direction of the edge is in the same direction as a direction of the gas transportation, which is from an upstream gas pipeline pointing to a downstream gas pipeline. As shown in FIG. 5, there is a connection relationship between the gas pipeline a and the gas pipeline c corresponding to the node A and the node C, respectively, in the distribution mapping 500, and the gas pipeline a is an upstream pipeline and the gas pipeline c is a downstream pipeline, so there exists an edge AC pointing from the node A to the node C.

In 420, the abnormal probability of the gas pipelines in the predetermined future time period based on the distribution mapping is determined through an analysis model.

The analysis model refers to a model configured to predict the abnormal probability of the gas pipelines in the predetermined future time period. The analysis model may be a machine learning model. More descriptions of the analysis model may be found in FIG. 6 and related descriptions.

In 430, the abnormal probability of the one or more spot-check sites in the predetermined future time period is determined based on the abnormal probability of the gas pipelines in the predetermined future time period.

In some embodiments, the distributed energy safety management platform designates a spot-check site with a smallest transportation distance from the gas pipeline as a spot-check site corresponding to the gas pipeline; performs an averaging operation on the abnormal probabilities of the plurality of pipelines corresponding to the one or more spot-check sites in the predetermined future time period, and determines the average value as the abnormal probability of the one or more spot-check sites in the predetermined future time period.

In some embodiments of the present disclosure, by constructing the distribution mapping and determining the abnormal probability in combination with the analysis model, the prediction of the abnormal probability can be carried out more comprehensively and quickly, which helps to improve the degree of intelligence and precision of energy safety management.

It should be noted that the foregoing descriptions of the process 200, the process 300, and the process 400 are for the purpose of exemplification and illustration only, and do not limit the scope of application of the present disclosure. For a person skilled in the art, various corrections and changes may be made to the process 200, the process 300, and the process 400 under the guidance of the present disclosure. However, these corrections and changes remain within the scope of the present disclosure.

Figure 6:
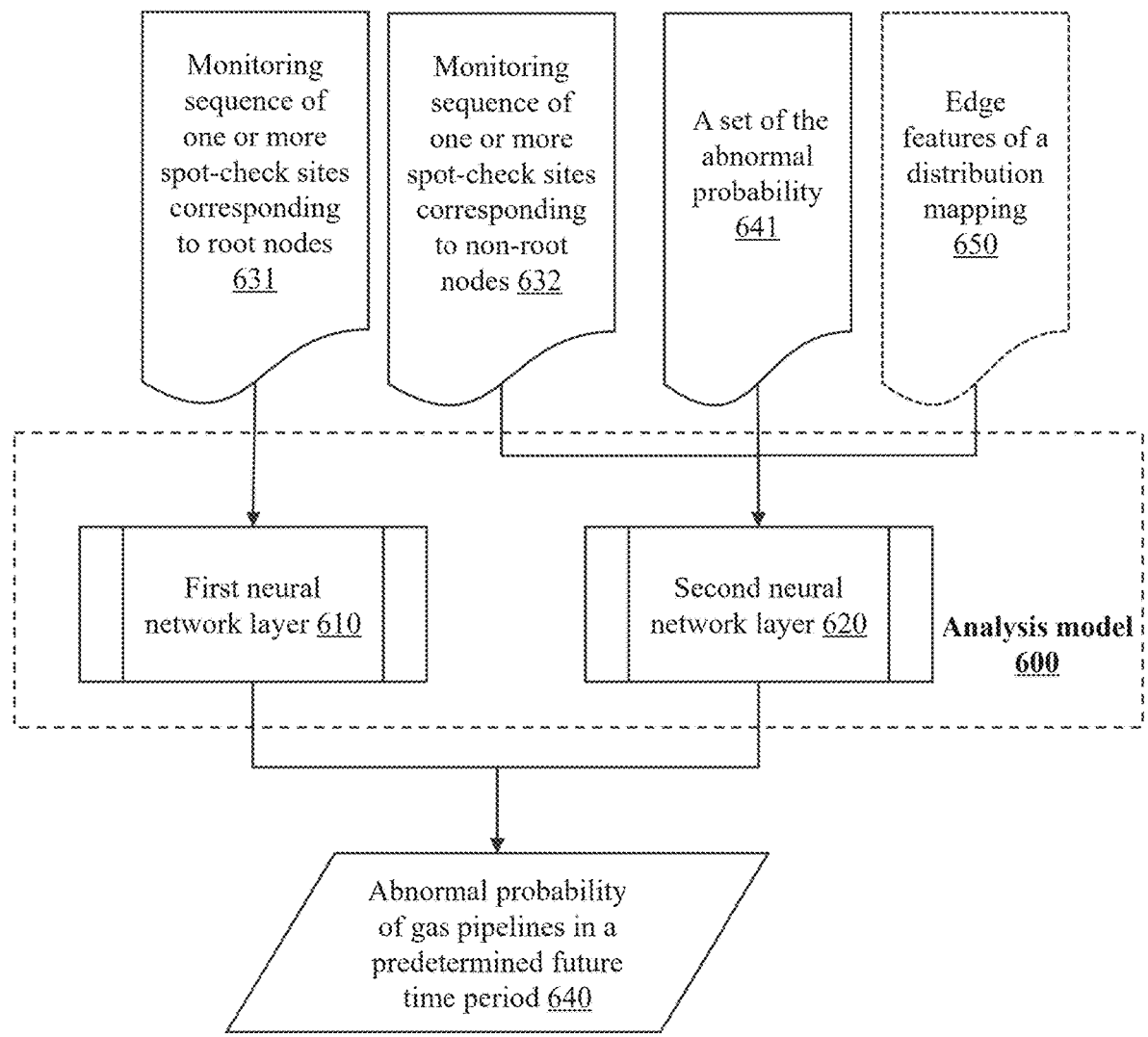
FIG. 6 is an exemplary schematic illustrating an analysis model according to some embodiments of the present disclosure.

FIG. 6 is an exemplary schematic illustrating an analysis model according to some embodiments of the present disclosure.

In some embodiments, as shown in FIG. 6, the analysis model 600 includes a first neural network layer 610 and a second neural network layer 620, the first neural network layer corresponds to a root node of a distribution mapping, the second neural network layer corresponds to a non-root node of the distribution mapping, and connection relationships between different neural network layers are determined based on edges of the distribution mapping; inputs of the first neural network layer 610 include a monitoring sequence 631 of one or more spot-check sites corresponding to the root node, and outputs of the first neural network layer 610 include an abnormal probability 640 of gas pipelines corresponding to the root node in a predetermined future time period; inputs of the second neural network layer 620 include a monitoring sequence 632 of the one or more spot-check sites corresponding to the non-root node a set of abnormal probability 641 of nodes pointing to the non-root node in the predetermined future time period, and outputs of the second neural network layer 620 include the abnormal probability 640 of the gas pipelines corresponding to the non-root node in the predetermined future time period.

The first neural network layer corresponds one-to-one with the root node in the distribution mapping, and the second neural network layer corresponds one-to-one with the non-root node in the distribution mapping.

The root node refers to a node for which there are no edges pointing to the node from other nodes, such as the node A and the node B as shown in FIG. 5.

The non-root node refers to a node for which there are edges pointing to the node from other nodes, such as, the node C, the node D, the node E as shown in FIG. 5.

The first neural network layer refers to a model for determining the abnormal probability corresponding to the root node. In some embodiments, the first neural network layer may be a machine learning model, such as a Deep Neural Network (DNN) model, or the like.

In some embodiments, the monitoring sequence of the one or more spot-check sites corresponding to the root nodes corresponding to the first neural network layer may be uploaded for acquisition by a monitoring device at the spot-check site.

The second neural network layer refers to a model for determining the abnormal probability corresponding to the non-root node. In some embodiments, the second neural network layer may be a machine learning model, such as a deep neural network model, or the like.

In some embodiments, the monitoring sequence of the one or more spot-check sites corresponding to the non-root nodes corresponding to the second neural network layer may be uploaded for acquisition by the monitoring device at the spot-check site.

The set of abnormal probability refers to a set of the abnormal probability for the gas pipelines corresponding to nodes that points to the non-root nodes. In some embodiments, the distributed energy safety management platform may traverse the distribution mapping to find all other nodes pointing to the non-root node, then counts the abnormal probability of the gas pipelines corresponding to other nodes in the predetermined future time period, and determine the set of abnormal probability in the predetermined future time period.

Because the execution and training of the analysis model progressively progresses along a direction of the gas transportation, outputs of the neural network layer corresponding to an upstream node are generated earlier than outputs of the neural network layer corresponding to a downstream node during the same batch of training. Since all other nodes pointing to the non-root node are located upstream of the non-root node, the distributed energy safety management platform may obtain existing outputs of the analysis model regarding all other nodes during the same batch of training, and aggregate to obtain the set of abnormal probability for the gas pipeline corresponding to the nodes pointing to the non-root node in the predetermined future time period.

As shown in FIG. 6, inputs of the second neural network layer further include edge features 650 of the distribution mapping, wherein the edge features 650 of the distribution mapping refers to an edge feature of the edge that is involved in the non-root node corresponding to the second neural network layer in the distribution mapping. The edge features include an influence degree of upstream pipelines on downstream pipelines.

The influence degree of upstream pipelines on downstream pipelines refers to a degree to which extent flow change of the upstream pipelines affect the pressure of the downstream pipelines.

In some embodiments, the influence degree of upstream pipelines on downstream pipelines is related to a fluctuation range of the flow sensing data in the monitoring sequence of the upstream pipelines and a fluctuation range of the pressure sensing data in the monitoring sequence of the downstream pipelines. For example, the influence degree of upstream pipelines on downstream pipelines is inversely proportional to the fluctuation range of the flow sensing data in the monitoring sequence of the upstream pipelines and directly proportional to the fluctuation range of the pressure sensing data in the monitoring sequence of the downstream pipelines. In some embodiments, the fluctuation range of the flow sensing data and the fluctuation range of the pressure sensing data may be expressed in terms of a flow fluctuation value and a pressure fluctuation value, respectively. More descriptions of the flow fluctuation value and the pressure fluctuation value may be found in FIG. 2 and related descriptions.

In some embodiments, the distributed energy safety management platform may determine, based on the fluctuation range of the flow sensing data in the monitoring sequence of the upstream pipelines and the fluctuation range of the pressure sensing data in the monitoring sequence of the downstream pipelines, the influence degree of upstream pipelines on downstream pipelines by a predetermined formula. Exemplarily, the predetermined formula may be represented by the following formula (4):

$$a = h_d / f_u \quad (4)$$

a denotes the influence degree of upstream pipelines on downstream pipelines, $h_d$ denotes the fluctuation range of the pressure sensing data in the monitoring sequence of the downstream pipelines, and $f_u$ denotes the fluctuation range of the flow sensing data in the monitoring sequence of the upstream pipelines.

In some embodiments of the present disclosure, when predicting the abnormal probability of a pipeline, considering a difference in the influence degree of different upstream pipelines on the pipeline corresponding to the node can improve the accuracy of the model prediction.

In some embodiments, each neural network layer corresponds one-to-one to a node respectively, i.e., corresponds to each gas pipeline, and the edges of the distribution mapping denote the connection relationships between different gas pipelines, and thus based on the edges of the distribution mapping, the connection relationships between different neural network layers can be determined.

In some embodiments, the analysis model may be obtained by training in a plurality of ways. For example, the distributed energy safety management platform may obtain a trained analysis model based on overall training or local training.

The overall training refers to selecting the neural network layers corresponding to all nodes in the distribution mapping for training.

In some embodiments, the overall training of the analysis model may be performed by jointly training.

The distributed energy safety management platforms may jointly train the analysis model based on a large number of training samples with labels.

In some embodiments, the distributed energy safety management platform may input a first training sample into an initial first neural network layer, obtain outputs of the initial first neural network layer; input the outputs of the initial first neural network layer and a second training sample corresponding to the non-root node connected to the root node into an initial second neural network layer corresponding to the non-root node, obtain outputs of the initial second neural network layer; if there are other non-root nodes connected to the non-root node, further input the outputs of the initial second neural network layer and the second training samples corresponding to the other non-root nodes into other initial second neural network layers corresponding to the other non-root nodes, obtain outputs of the other initial second neural network layers, . . . , and so on, until all nodes need to be trained for training the analysis model are traversed, construct a loss function based on the outputs of the second neural network layer that is final traversed and a second label corresponding to the second neural network layer, iteratively update the analysis model based on the loss function, and when a preset condition is satisfied, complete the training and obtain the trained analysis label. The preset condition may be that the loss function converges, the number of iterations reaches a threshold, or the like.

In some embodiments, the overall training of the analysis model may also be performed by layered training.

The distributed energy safety management platform may train the analysis model based on a large number of training samples with labels hierarchically.

In some embodiments, the distributed energy safety management platform may input the first training sample into the initial first neural network layer, obtain the outputs of the initial first neural network layer, construct a loss function based on the outputs of the initial first neural network layer and a first label, iteratively update the initial first neural network layer based on the loss function, and when the preset condition is satisfied, complete the training and obtain a trained first neural network layer.

In some embodiments, the distributed energy safety management platform may train the initial second neural network layers based on the second training samples and the second labels, which is similar to the layered training process of the first neural network layer, which is not described herein.

In some embodiments, the distributed energy safety management platform may choose to perform further local training on some of the nodes therein as needed after the overall training is completed.

The local training refers to selecting the neural network layers corresponding to some of the nodes in the distribution mapping for training.

When performing the local training, the distributed energy safety management platform may select a portion of the neural network layers in the analysis model for training based on the connection relationships between different neural network layers in the distribution mapping. For example, the neural network layer corresponding to a node whose sum of absolute values of in-degree and out-degree is higher than a preset in/out degree threshold is selected for the local training. The preset in/out degree threshold refers to a preset maximum value of the sum of the absolute values of the in-degree and the out-degree. The preset in/out degree threshold may be preset by a staff.

Through further local training of some nodes with relatively complex connection relations of the gas pipelines, the neural network layers corresponding to the whole distribution mapping do not need to be trained repeatedly (i.e., the entire analysis model does not need to be trained repeatedly), which helps to save computational resources and improve the prediction efficiency.

In some embodiments, the local training of the analysis model may also be trained by jointly training or layered training, which may be referred to similarly to the corresponding illustration of the overall training above, with the difference that the training samples of the second neural network layers corresponding to the non-root nodes involve in the local training may also include the outputs of the second neural network layer corresponding to all nodes pointing to the non-root node obtained from the overall training process.

In some embodiments, for the first neural network layer, the distributed energy safety management platform may select a historical monitoring sequence of the spot-check site corresponding to the root node as the first training sample, and determine whether the gas pipelines corresponding to the set of the first training samples are subsequently actually anomalous as the corresponding first labels.

In some embodiments, for the second neural network layer, the distributed energy safety management platform may select a historical monitoring sequence of the spot-check site corresponding to the non-root node thereof and a set of subsequent actual anomalies of the gas pipeline corresponding to the node pointing to the non-root node as the second training sample, and determine whether the gas pipelines corresponding to the set of the second training samples are subsequently actually anomalous as the corresponding second labels.

In some embodiments, the second training samples may further include a historical influence degree of upstream pipelines of the non-root node on the non-root node.

Understandably, the training samples for each single-layer neural network are taken only from the historical monitoring sequences of the one or more spot-check sites of the corresponding nodes of the single-layer neural network, excluding the historical monitoring sequences of other spot-check sites.

In some embodiments, the distributed energy safety management platform may also construct, for each training sample corresponding to each first neural network layer in the set of training samples, fourth clustering vectors corresponding to the first neural network layer. The fourth clustering vectors include the historical monitoring sequence of the one or more spot-check sites corresponding to the root nodes. The distributed energy safety management platform may cluster a plurality of fourth clustering vectors, and for each cluster obtained by clustering, count a number of times of the occurrence of the anomalies in the subsequent time period of the training samples included therein, and take the ratio of the number of times to the total number of training samples of the class as the first label corresponding to the first neural network layer. The occurrence of the anomalies in the subsequent time period means that the gas pipeline corresponding to the spot-check site corresponding to the training sample is anomalous in the subsequent time period.

In some embodiments, the distributed energy safety management platform may further construct, for each training sample corresponding to each second neural network layer in the set of training samples, respectively, fifth clustering vectors corresponding to the second neural network layer. The fifth clustering vectors include the historical monitoring sequence of the one or more spot-check sites corresponding to the non-root nodes thereof, a set of subsequent actual anomalies of the gas pipeline corresponding to the node pointing to the non-root node, a historical influence degree of upstream pipelines of the non-root node on the non-root node. The distributed energy safety management platform may cluster a plurality of fifth clustering vectors, and for each cluster obtained by clustering, count a number of times of the occurrence of the anomalies in the subsequent time period of the training samples included therein, and take the ratio of the number of times to the total number of training samples of the class as the second label corresponding to the second neural network layer.

In some embodiments, when training the analysis model based on a training dataset, the training dataset is used to train the neural network layer corresponding to each node. A number of training samples in the training dataset is greater than a sample size threshold corresponding to each node. The sample size threshold is associated with the in-degree and the out-degree of each node.

The sample size threshold refers to a maximum number of training samples for a single neural network layer, such as 100 training samples, or the like.

The in-degree refers to a number of edges pointing toward the node. The out-degree refers to a number of edges pointing to other nodes from the node. In some embodiments, the in-degree and the out-degree of the node may be statistically obtained when plotting the distribution mapping.

In some embodiments, the sample size threshold is related with the in-degree and the out-degree of the node. For example, the greater the sum of the in-degree and the out-degree of the node, the greater the sample size threshold.

In some embodiments of the present disclosure, the in-degree and the out-degree of the node are also considered when training the analysis model, which can adjust the training dataset for the actual connection of the gas pipelines corresponding to the node, improve diversity of the training dataset, and help to train a more accurate model, thereby improving the reliability of the predicted abnormal probability.

In some embodiments, the training process of the analysis model may include: obtaining the training dataset, the training dataset including a number of training samples and labels corresponding to each of the training samples; executing a plurality of rounds of iterations, the at least one round of iterations including: selecting one or more training samples from the training dataset, inputting the one or more training samples into an initial analysis model, obtaining a predicted output of the initial analysis model corresponding to the one or more training samples; calculating a value of the loss function by substituting the predicted output of the initial analysis model corresponding to the one or more training samples and the labels corresponding to the one or more training samples into a formula for a predefined loss function; inversely updating model parameters in the initial analysis model based on the value of the loss function; and when an iteration end condition is satisfied, ending the iteration and obtaining the trained analysis model.

In some embodiments of the present disclosure, updating the model parameters of the analysis model in reverse through the plurality of rounds of iterations can make the model predictions as close as possible to true values, thereby improving the performance and accuracy of the model.

In some embodiments of the present disclosure, utilizing data processing capability and adaptability of the model, the prediction of the abnormal probability of each gas pipeline can be made separately by the analysis model constituted by the plurality of neural network layers, which can make a predicted value of the abnormal probability more accurate, reduce a waste of time in determining the abnormal probability of the plurality of gas pipelines.

It should be understood that the embodiments described in the present disclosure are only used to illustrate the principles of the embodiments of the present disclosure. Other deformations may also fall within the scope of the present disclosure. As such, alternative configurations of embodiments of the present disclosure may be considered to be consistent with the teachings of the present disclosure as an example, not as a limitation. Correspondingly, the embodiments of the present disclosure are not limited to the embodiments expressly presented and described herein.

What is claimed is:

1. An Internet of Things (IoT) system for distributed energy pipeline natural gas transmission safety management, comprising: a distributed energy user platform, a distributed energy safety management platform, a distributed energy sensing and control platform, a distributed energy safety service platform, and a distributed energy sensing network platform; wherein the distributed energy sensing and control platform includes a monitoring sensing and control platform and a maintenance sensing and control platform;

the monitoring sensing and control platform is configured to receive monitoring instructions and control one or more monitoring devices and a crawling robot based on the monitoring instructions;

the maintenance sensing and control platform is configured to receive maintenance instructions and deploy maintenance personnel based on the maintenance instructions;

the distributed energy safety service platform is configured to connect the distributed energy user platform with the distributed energy safety management platform for data transmission;

the distributed energy safety management platform is configured to:

obtain a safety management region, the safety management region being provided with one or more spot-check sites;

determine, based on a preset cycle, whether a monitoring sequence of the one or more spot-check sites satisfies a first preset condition during a preset historical time period; the first preset condition being related to amount of monitoring data in the monitoring sequence which is not in a normal range;

in response to determining that the monitoring sequence of the one or more spot-check sites does not satisfy the first preset condition, maintain a first monitoring instruction of the one or more spot-check sites;

in response to determining that the monitoring sequence of the one or more spot-check sites satisfies the first preset condition, adjust the first monitoring instruction based on the monitoring sequence and an inspection sequence in the preset historical time period, and send a second monitoring instruction obtained after adjustment to the monitoring sensing and control platform;

determine an abnormal probability of the one or more spot-check sites in a predetermined future time period based on the monitoring sequence, the inspection sequence, and an adjacency matrix of gas pipelines;

including: constructing a distribution mapping of the safety management region based on the monitoring sequence of the one or more spot-check sites and the adjacency matrix of the gas pipelines; wherein nodes of the distribution mapping are the gas pipelines, and node features of the distribution mapping are the monitoring sequence of the one or more spot-check sites that satisfy a predetermined distance condition, and edges of the distribution mapping denote connection relationships between different gas pipelines;

determining an abnormal probability of the gas pipelines in the predetermined future time period based on the distribution mapping through an analysis model; wherein the analysis model is a machine learning model; and determining the abnormal probability of the one or more spot-check sites in the predetermined future time period based on the abnormal probability of the gas pipelines in the predetermined future time period, wherein the adjacency matrix of the gas pipelines refers to a two-dimensional matrix for reflecting connectivities of different gas pipelines; and generate the maintenance instructions based on the abnormal probability, send the maintenance instructions to the maintenance sensing and control platform to deploy the maintenance personnel.

2. The system of claim 1, wherein the preset cycle is negatively related to an adjustment frequency of the monitoring instructions.

3. The system of claim 1, wherein the distributed energy safety management platform is further configured to:
   in response to determining that the abnormal probability is greater than a first predetermined threshold, generate the maintenance instructions; wherein the first predetermined threshold is negatively related to a count of the gas pipelines within the safety management region.

4. The system of claim 1, wherein the distributed energy safety management platform is further configured to:
   divide the safety management region into one or more transportation path segments;
   determine positions of the one or more spot-check sites and initial monitoring instructions within the transportation path segments based on historical inspection data; and
   in response to determining that the one or more spot-check sites do not satisfy a second preset condition, adjust positions of the one or more spot-check sites and a distance interval for sending sensor data during inspection of the crawling robot based on the inspection sequence; wherein the second preset condition is related to monitoring data of the one or more spot-check sites.

5. The system of claim 1, wherein the analysis model includes a first neural network layer and a second neural network layer; the first neural network layer corresponds to a root node of the distribution mapping, the second neural network layer corresponds to a non-root node of the distribution mapping, and connection relationships between different neural network layers are determined based on edges of the distribution mapping;
   inputs of the first neural network layer include the monitoring sequence of the one or more spot-check sites corresponding to the root node, and outputs of the first neural network layer include the abnormal probability of the gas pipelines in the predetermined future time period; and
   inputs of the second neural network layer include the monitoring sequence of the one or more spot-check sites corresponding to the non-root node, a set of the abnormal probability of nodes pointing to the non-root node in the predetermined future time period, and outputs of the second neural network layer include the abnormal probability of the gas pipelines in the predetermined future time period.

6. The system of claim 5, wherein the inputs of the second neural network layer further include edge features of the distribution mapping, the edge features include an influence degree of upstream pipelines on downstream pipelines.

7. The system of claim 1, wherein the distributed energy safety management platform is further configured to:
   generate a device regulation instruction based on the abnormal probability; and
   add or delete at least one of the one or more spot-check sites or the crawling robot of the one or more transportation path segments based on the device regulation instruction.

8. The system of claim 1, wherein the distributed energy safety management platform is further configured to:
   adjust, based on the abnormal probability, the second monitoring instruction for the one or more spot-check sites, and send a third monitoring instruction obtained after adjustment to the monitoring sensing and control platform.

9. A method for distributed energy pipeline natural gas transmission safety management, wherein the method is executed by a distributed energy safety management platform of an IoT system for distributed energy pipeline natural gas transmission safety management, and the method comprises:
   obtaining a safety management region, the safety management region being provided with one or more spot-check sites;
   determining, based on a preset cycle, whether a monitoring sequence of the one or more spot-check sites satisfies a first preset condition during a preset historical time period; the first preset condition being related to amount of monitoring data in the monitoring sequence which is not in a normal range;
   in response to determining that the monitoring sequence of the one or more spot-check sites does not satisfy the first preset condition, maintaining a first monitoring instruction of the one or more spot-check sites;
   in response to determining that the monitoring sequence of the one or more spot-check sites satisfies the first preset condition,
   adjusting the first monitoring instruction based on the monitoring sequence and an inspection sequence in the preset historical time period, and sending a second monitoring instruction obtained after adjustment to a monitoring sensing and control platform;
   determining an abnormal probability of the one or more spot-check sites in a predetermined future time period based on the monitoring sequence, the inspection sequence, and an adjacency matrix of gas pipelines;
      including: constructing a distribution mapping of the safety management region based on the monitoring sequence of the one or more spot-check sites and the adjacency matrix of the gas pipelines; wherein nodes of the distribution mapping are the gas pipelines, and node features of the distribution mapping are the monitoring sequence of the one or more spot-check sites that satisfy a predetermined distance condition, and edges of the distribution mapping denote connection relationships between different gas pipelines;
      determining an abnormal probability of the gas pipelines in the predetermined future time period based on the distribution mapping through an analysis model; wherein the analysis model is a machine learning model; and
   determining the abnormal probability of the one or more spot-check sites in the predetermined future time period based on the abnormal probability of the gas pipelines in the predetermined future time period, wherein the adjacency matrix of the gas pipelines refers to a two-dimensional matrix for reflecting connectivities of different gas pipelines; and
   generating maintenance instructions based on the abnormal probability, sending the maintenance instructions to a maintenance sensing and control platform to deploy maintenance personnel.

* * * * *